(12) United States Patent
Selektor

(10) Patent No.: US 7,050,947 B2
(45) Date of Patent: May 23, 2006

(54) REMOTE CONTROL COMMUNICATION INCLUDING SECURE SYNCHRONIZATION

(75) Inventor: Vitaliy Selektor, Troy, MI (US)

(73) Assignee: Siemens VDO Automotive Corporation, Auburn Hills, NJ (US)

( * ) Notice: Subject to any disclaimer, the term of this patent is extended or adjusted under 35 U.S.C. 154(b) by 161 days.

(21) Appl. No.: 10/315,522

(22) Filed: Dec. 10, 2002

(65) Prior Publication Data

US 2003/0129949 A1 Jul. 10, 2003

Related U.S. Application Data

(60) Provisional application No. 60/346,911, filed on Jan. 4, 2002.

(51) Int. Cl.
G06F 15/00 (2006.01)
H03F 1/26 (2006.01)

(52) U.S. Cl. ........................................ 702/189; 380/255

(58) Field of Classification Search .................. 702/89, 702/189; 380/274, 276, 270, 255; 340/426.13, 340/246.16, 426.17, 426.18, 426.36; 307/9.1, 307/10.1–10.8; 713/400; 455/88
See application file for complete search history.

(56) References Cited

U.S. PATENT DOCUMENTS

| 5,060,266 | A | * | 10/1991 | Dent | 380/274 |
|---|---|---|---|---|---|
| 5,243,653 | A | * | 9/1993 | Malek et al. | 380/272 |
| 5,508,687 | A | * | 4/1996 | Gebhardt et al. | 340/5.26 |
| 5,517,187 | A | * | 5/1996 | Bruwer et al. | 340/5.26 |
| 5,646,996 | A | * | 7/1997 | Latka | 380/274 |
| 5,774,550 | A | * | 6/1998 | Brinkmeyer et al. | 713/168 |
| 5,844,517 | A | * | 12/1998 | Lambropoulos | 341/176 |
| 5,862,225 | A | * | 1/1999 | Feldman et al. | 380/274 |
| 5,937,065 | A | * | 8/1999 | Simon et al. | 380/262 |
| 6,026,165 | A | * | 2/2000 | Marino et al. | 380/273 |
| 6,028,527 | A | * | 2/2000 | Soenen et al. | 340/5.26 |
| 6,046,680 | A | * | 4/2000 | Soenen et al. | 340/5.23 |
| 6,108,326 | A | * | 8/2000 | Bruwer | 370/342 |
| 6,130,622 | A | * | 10/2000 | Hussey et al. | 340/5.61 |
| 6,169,492 | B1 | * | 1/2001 | Dabbish | 340/5.2 |
| 6,191,701 | B1 | * | 2/2001 | Bruwer | 340/5.22 |
| 6,194,991 | B1 | * | 2/2001 | Barrs et al. | 340/5.72 |
| 6,329,909 | B1 | * | 12/2001 | Siedentop et al. | 340/636.19 |
| 6,370,160 | B1 | * | 4/2002 | Knutson et al. | 370/503 |
| 6,697,490 | B1 | * | 2/2004 | Mizikovsky et al. | 380/262 |
| 2001/0052075 | A1 | * | 12/2001 | Feinberg | 713/168 |
| 2002/0110242 | A1 | * | 8/2002 | Bruwer | 380/255 |
| 2002/0175827 | A1 | * | 11/2002 | Klein et al. | 340/825.19 |

* cited by examiner

Primary Examiner—Bryan Bui
Assistant Examiner—Demetrius Pretlow

(57) ABSTRACT

A remote communication system (20) includes a signaling device (24) and a remotely located controller (26). The signaling device (24) includes a synchronization counter (44) and the controller includes a synchronization counter (34). Under normal circumstances, a transmitter (42) sends signals that are received by a receiver (32) and then processed appropriately by the controller (26). Transmissions from the transmitter (42) to the receiver (32) preferably are encrypted and then deciphered based upon a value from the synchronization counters. When the synchronization counter values do not correspond sufficiently to allow effective communication, synchronization counter value information is shared using a bi-directional communication link (50, 52) so that there may be correspondence between the synchronization counter values. In one example, low frequency (LF) signals are used for transmitting the synchronization counter values across the bi-directional communication link.

17 Claims, 1 Drawing Sheet

REMOTE CONTROL COMMUNICATION INCLUDING SECURE SYNCHRONIZATION

CROSS REFERENCE TO RELATED APPLICATIONS

This application claims priority to U.S. Provisional Patent Application No. 60/346,911 filed Jan. 4, 2002.

BACKGROUND OF THE INVENTION

1. Field of the Invention

This invention generally relates to remote communications for systems such as remote keyless entry systems. More particularly, this invention relates to secure synchronization for facilitating remote control communications.

2. Description of the Prior Art

Many remote control systems such as remote keyless entry systems use rolling code schemes to prevent code capturing that would allow an unauthorized individual to gain access to the system. Typical rolling code schemes rely upon a synchronization counter that is incremented on each new transmitted command by the remote signaling device. In some situations, the synchronization counter value is used as an input into an encryption algorithm to generate a rolling code. The receiving unit that receives the command must have the synchronization counter at the same value or within an acceptable window, depending on the particular system. If the synchronization counter of the remote signaling device and the receiving device do not match or sufficiently correspond, an authorized transmission is not received and handled as a valid transmission. One example situation where the synchronization counters may not match is when a remote signaling device is continually activated (purposefully or accidentally) outside the range of the receiver so that the counter on the remote signaling unit is repeatedly incremented while the counter on the receiving unit is not.

It is not acceptable to overcome the difficulty of unmatching synchronization counter values by simply transmitting the synchronizer counter value from the remote transmitting unit in a fully open state, because that allows it to be susceptible to unauthorized signal capture, which is the entire point of utilizing a synchronization counter. Accordingly, open transmission of the synchronization counter information defeats the purpose of utilizing the synchronization counter.

There is a need for being able to continue communications between a remote signaling unit and a receiver that rely upon matching synchronization counter values to establish effective, secure communication.

This invention addresses the need for re-establishing synchronization where a remote signaling device and a receiver are otherwise incapable of utilizing secure communication that is based at least in part on corresponding synchronization counter values.

SUMMARY OF THE INVENTION

In general terms, this invention is a remote communication system where synchronization counter information is securely wirelessly transmitted between devices to establish synchronization between the devices.

One example system designed according to this invention includes a signaling device that has a synchronization counter that is periodically incremented based upon a selected number of transmissions from the remote signaling device. A remotely located controller includes a synchronization counter that is incremented in a manner corresponding to that used in the remote signaling device. The signaling device and the remotely located controller each include a bi-directional communication portion over which synchronization counter information from one of the devices is securely transmitted to the other of the devices to synchronize the synchronization counters of the two devices on an as-needed basis.

In one example system designed according to this invention, the signaling device includes a transmitter that normally transmits a signal to the remotely located controller. The signaling device also includes a transceiver that is capable of receiving or transmitting synchronization counter information. The remotely located controller, which may be supported on a vehicle, for example, includes a receiver that normally receives the signals transmitted by the transmitter of the remote signaling device. A transceiver of the remotely located controller is capable of transmitting or receiving synchronization counter information and communicating with the transceiver of the remote signaling device.

In one example, the transceivers utilize a low frequency (LF) signal that is encrypted for secure and reliable transmission of the synchronization counter information. A low frequency signal requires that the signaling device and the receiver in the controller be in close proximity, which enhances security.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
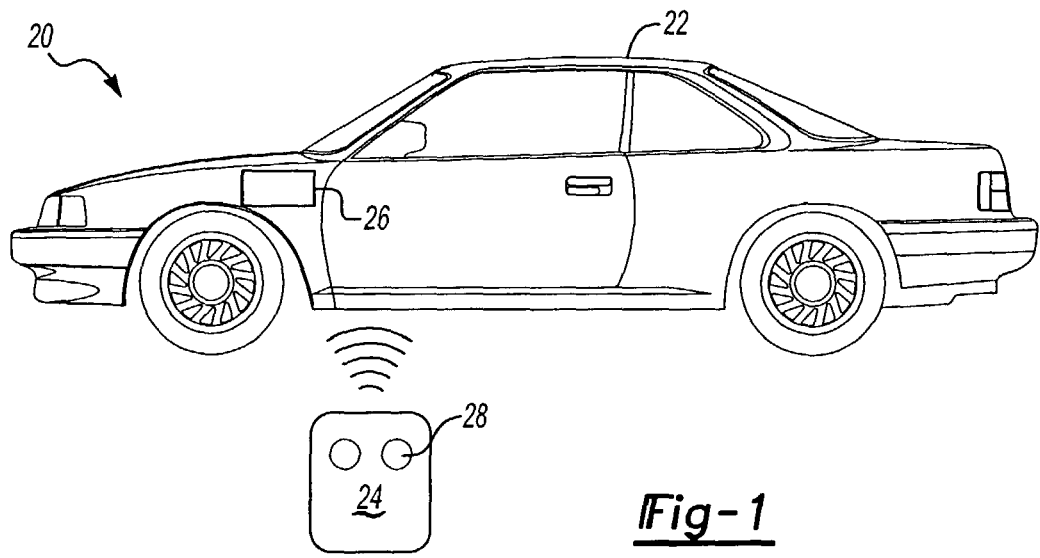
FIG. 1 schematically illustrates a communication system designed according to this invention that is well suited for remote communications between a remote signaling device and a controller supported on a vehicle.

FIG. 1 shows an example remote communication system 20. The illustrated example is configured for communications between a vehicle 22 and a signaling device 24. A controller 26 is supported on the vehicle 22 and is responsible for various operations as known in the art such as remote keyless entry, ignition kill switch operation, remote ignition control and similar features. The signaling device 24 may take a variety of forms including a key fob that has signaling buttons 28 that activate switches for communicating desired signals to the controller 26. In another example, the remote signaling device 24 is a passive device that does not require any action by the user (i.e., a key with a signaling portion supported on the body of the key or a so-called smart card).

Communications between the signaling device 24 and the remotely located controller 26 preferably are wireless. In one example, radio frequency signals are used for the majority of the communications between the signaling device 24 and the controller 26. In one particular example, low frequency (LF) signal transmissions are used for specific communications between the signaling device 24 and the controller 26 as will be described below.

The communications between the signaling device 24 and the controller 26 preferably are encrypted using known techniques so that the communications are secure from code grabbing techniques that would allow an unauthorized individual to gain access to the vehicle 22, for example. In one example, the encrypted communications depend upon some synchronization or correspondence between synchronization counters of the signaling device 24 and the controller 26.

Figure 2:
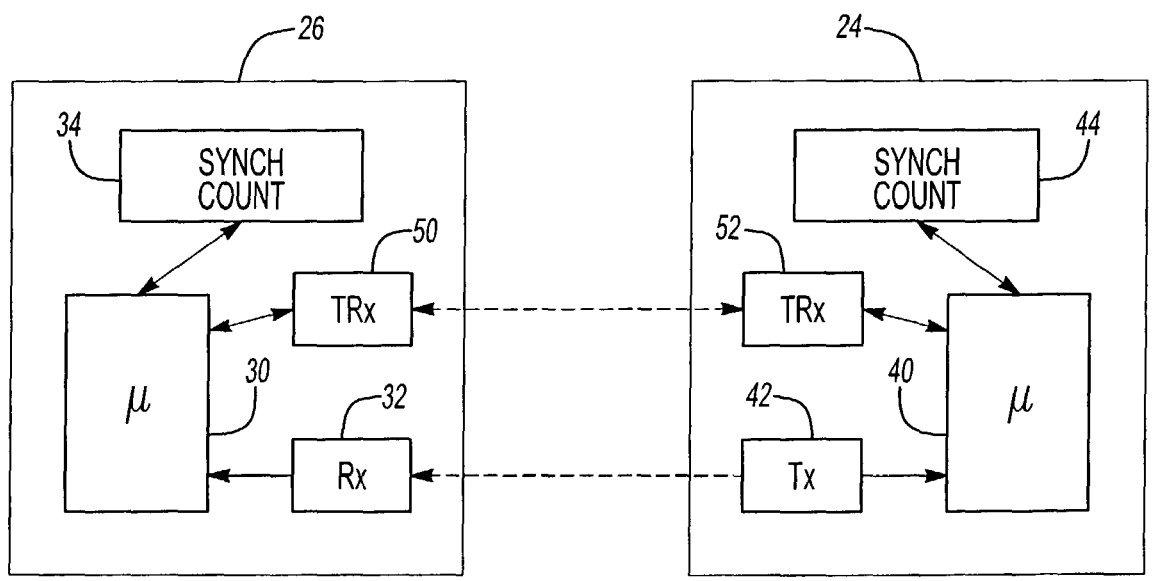
FIG. 2 schematically illustrates communications in a system designed according to this invention.

FIG. 2 schematically illustrates selected portions of the controller 26 and the signaling device 24. A control unit 30 is responsible for carrying out the main functions of the controller 26. A receiver portion 32 receives signals from the signaling device 24. A synchronization counter 34 provides a value used to decipher encrypted signal transmissions received from the signaling device 24.

A control unit 40 in the signaling device 24 normally controls a transmitter 42 that sends the signals to the receiver 32. A synchronization counter 44 in the remote signaling device 24 provides a value used to encrypt the transmitted signal. The counter value is incremented on a regular basis. (e.g., in a selected pattern ). In one example, the valve is incremented with each transmitted signal from the transmitter 42. The synchronization counter 34 increments its value in a similar manner (e.g., in the selected pattern ).

Under most circumstances, a transmission from the transmitter 42 is received by the receiver 32 and appropriately handled by the control unit 30. This is possible when the synchronization counter values are the same or within a selected range from each other. Known techniques for selecting compatibility ranges may be used. Under some circumstances, however, the values of the synchronization counters 44 and 34 become so far apart that the controller 26, utilizing the value or information from the synchronization counter 34, is unable to decipher a signal received by the receiver 32 and, therefore, is unable to perform the function desired by the user of the signaling device 24. Under such circumstances, the inventive system utilizes a secure strategy for sharing synchronization counter information between the controller 26 and the remote signaling device 24 to establish synchronization between the synchronization counters so that further communications between the devices are possible.

The divisions in FIG. 2 are schematic and for discussion purposes. The synchronization counter values may be used directly by the transmitter 42 and the receiver 32 rather than by the control units 40 and 30. Various component combinations are within the scope of this invention.

In the illustrated example, the controller 26 includes a transceiver portion 50 that is capable of bi-directional communication with a transceiver portion 52 on the remote signaling device 24. In one example, the transceivers 50 and 52 communicate using low frequency (LF) signals. In one example, the signaling device 24 is part of a key and the LF transmissions occur only when the key is placed within an appropriate slot (such as a vehicle ignition). The receiver 32 and transmitter 42 in one example communicate utilizing radio frequency signals. A variety of signal types may be used and those skilled in the art who have the benefit of this description will be able to select appropriate signal frequencies and the best signaling strategy to meet the needs of their particular situation.

In one example, the control unit 30 of the controller 26 determines when a plurality of transmissions from the remote signaling device 24 have been received but were not considered valid because they could not be deciphered. The control unit 30 may be programmed to select a number of such transmissions for making such a determination, for example. Under such circumstances, the synchronization counter information of the controller 26 is transmitted using an encrypted signal through the transceiver 50 to the transceiver 52 of the remote signaling device 24. The control unit 40 of the remote signaling device 24 is programmed to gather the synchronization counter information from the controller 26 and then to adjust the synchronization counter 44 to make the value compatible with the value of the synchronization counter 34. This information then is used in subsequent transmissions from the transmitter 42 to the receiver 32.

In another example, the remote signaling device 24 initiates the synchronization between the synchronization counters by transmitting a signal using the transceiver 52 to the transceiver 50. Either device may initiate the synchronization between the synchronization counters 34 and 44. The control units 30 and 40 preferably are programmed to utilize a specific encryption and deciphering technique so that the synchronization counter information is shared and utilized only between authorized controllers 26 and remote signaling devices 24 to maintain the security of the wireless communication system.

While the example of FIG. 2 includes a separate transmitter 42 and transceiver 52 in the remote signaling device 24, it is also within the scope of this invention to have a single transceiver in the remote signaling device 24. Similarly, a single transceiver within the controller 26 may be used for the normal communications between the devices and the encrypted synchronization counter sharing information. In some such embodiments, the transceivers are capable of communicating at different signal levels such as radio frequency for normal transmissions and low frequency for synchronization counter transmissions.

Those skilled in the art who have the benefit of this description will be able to select from among commercially available components, to custom design circuitry and to develop the software necessary to accomplish the results provided by this invention.

The preceding description is exemplary rather than limiting in nature. Variations and modifications to the disclosed examples may become apparent to those skilled in the art that do not necessarily depart from the scope of this invention. The scope of legal protection given to this invention can only be determined by studying the following claims.

I claim:

1. A remote, wireless communication system, comprising:
   a signaling device having a transceiver that is capable of transmitting and receiving wireless communication signals, and a synchronization counter that has a value that changes in a selected pattern; and
   a remotely located controller that has a transceiver that communicates with the signaling device transceiver and has a synchronization counter that has a value that changes in the selected pattern, at least one of the transceivers selectively transmitting a synchronization counter value to the other transceiver to establish synchronization between the synchronization counters under selected conditions.

2. The system of claim 1, wherein the signaling device includes a transmitter that transmits signals independent of the signaling device transceiver and the remotely located controller includes a receiver that receives the transmitted signals.

3. The system of claim 2, wherein the transmitter and receiver operate using radio frequency signals and the transceivers operate using low frequency signals.

4. The system of claim 3, wherein the low frequency signals have a frequency that is lower than a radio frequency.

5. The system of claim 1, wherein the controller and the signaling device each include a control unit and wherein at least one of the control units determines that the synchronization counter values are not within an acceptable range and initiates a transmission of the synchronization counter value to the other using the transceivers.

6. The system of claim 5, wherein at least one of the control units determines that a selected number of transmissions from the signaling device to the remotely located controller were not appropriately deciphered by the controller and then initiates the synchronization counter value transmission.

7. The system of claim 1, wherein the signaling device synchronization counter autonomously changes the value in the selected pattern.

8. The system of claim 1 wherein the signaling device synchronization counter changes the value in the selected pattern independent of the remotely located controller.

9. The system of claim 1, wherein the transceivers only transmit the synchronization counter value to the other transceiver to establish synchronization between the synchronization counters.

10. A remote control communication system, comprising:
a signaling device having a transmitter that transmits at least one control signal, a synchronization counter that has a value that changes in a selected pattern, the signal transmitted by the transmitter utilizing a value of the synchronization counter for encrypting the information in the transmitted signal, the signaling device including a transceiver that is capable of bi-directional communication; and
a remotely located controller having a receiver that receives the transmitted signal, a synchronization counter having a value normally corresponding to the value of the signaling device synchronization counter, the remotely located controller having a transceiver that is capable of bi-directional communication with the signaling device transceiver and wherein the transceiver of the signaling device or the transceiver of the remotely located controller transmits the synchronization counter value to the other transceiver when there is inadequate correspondence between the synchronization counter values to allow effective communication between the signaling device and the remotely located controller.

11. The system of claim 10, wherein the transmitter and receiver operate using radio frequency signals and the transceivers operate using low frequency signals.

12. The system of claim 11, wherein the low frequency signals have a frequency lower than a radio frequency.

13. The system of claim 10, wherein the controller and the signaling device each include a control unit and wherein at least one of the control units determines that the synchronization counter values are not within an acceptable range and initiates a transmission of the synchronization counter value to the other using the transceivers.

14. The system of claim 13, wherein at least one of the control units determines that a selected number of transmissions from the signaling device to the remotely located controller were not appropriately deciphered by die controller and then initiates the synchronization counter value transmission.

15. The system of claim 10, wherein the signaling device synchronization counter autonomously changes the value in the selected pattern.

16. The system of claim 10, wherein the signaling device synchronization counter changes the value in the selected pattern independent of the remotely located controller synchronization counter.

17. The system of claim 10, wherein the transceivers only transmit the synchronization counter value to the other transceiver.

* * * * *